May 3, 1938. H. N. BINGHAM 2,115,702
WEED DESTROYER
Filed Dec. 8, 1936 3 Sheets-Sheet 3

Inventor
H. N. Bingham.
By Lacey & Lacey, Attorneys

Patented May 3, 1938

2,115,702

UNITED STATES PATENT OFFICE 2,115,702

WEED DESTROYER

Harvey N. Bingham, San Juan, Tex.

Application December 8, 1936, Serial No. 114,836

8 Claims. (Cl. 97—52)

This invention relates to agricultural implements, and has particular reference to weed destroyers, the object being to provide mechanism which may be drawn over a field and will be actuated by the travel of the machine to cut down and destroy all weeds and other obnoxious growth. One embodiment of the invention is illustrated in the accompanying drawings and will be hereinafter fully described, the novel features being particularly defined in the appended claims.

Figure 1:
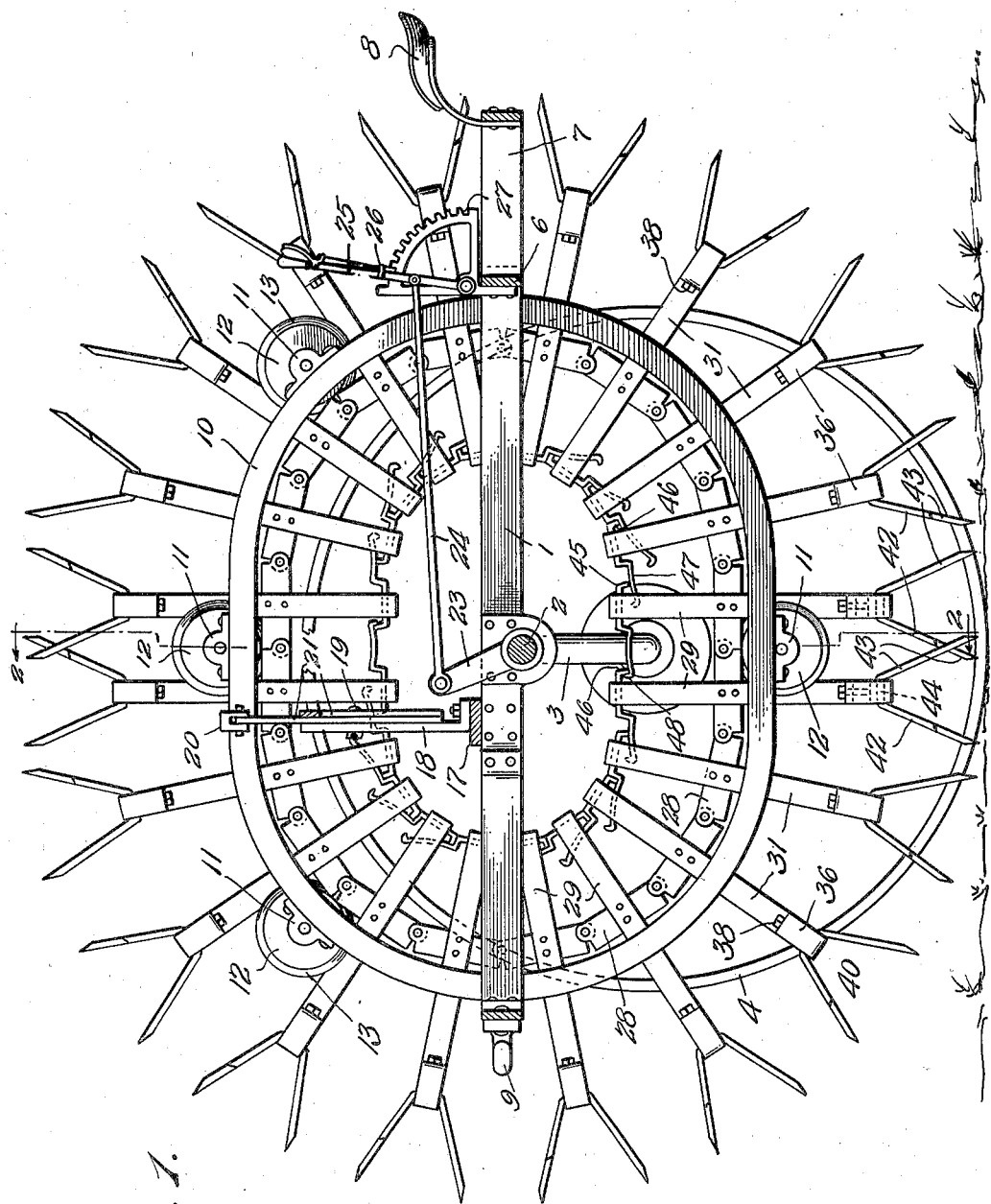
Figure 1 is a longitudinal section through a machine embodying the invention.

In the practice of the invention, there is provided a main frame 1 which is mounted upon an axle 2 having cranked ends 3 carrying ground wheels 4. The main frame comprises side bars 5 which are preferably formed in divergent relation toward their opposite ends, the ends of the bars being connected by cross bars 6, as shown, which preferably will be formed integral with the side bars, as clearly shown in Figure 3. To the rear cross bar 6, there is secured a frame 7 which supports the driver's seat 8 and upon the front cross bar at the center thereof is secured an eye 9 for the attachment of a draft device.

Figure 2:
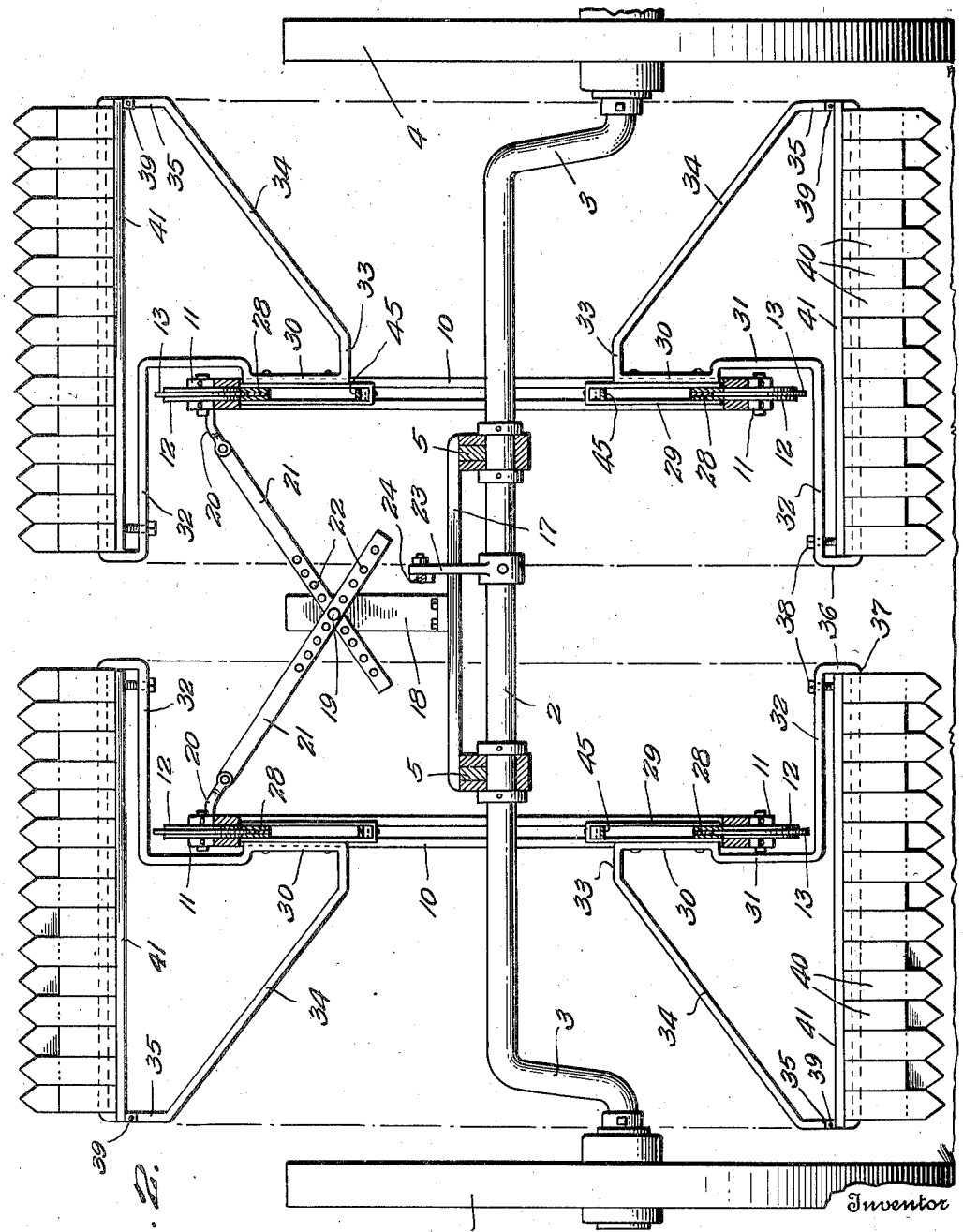
Figure 2 is a rear elevation, with parts in section.
Figure 3:
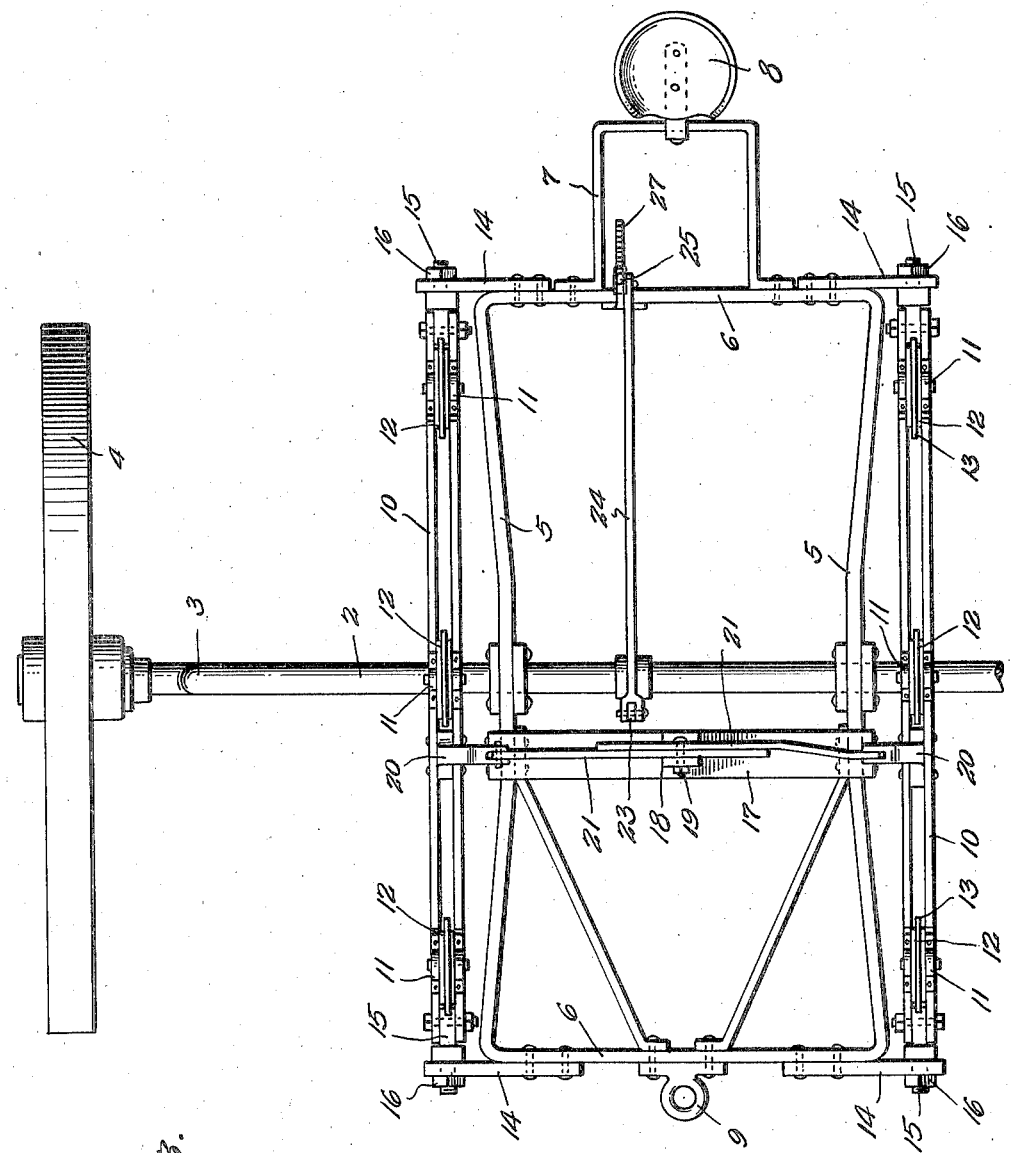
Figure 3 is a top plan view, with the weed destroying blades omitted.

Disposed at the sides of the main frame are elliptical guide frames or tracks 10 which, as shown in Figures 2 and 3, comprise parallel bars of the same shape and dimensions. Upon the tracks 10 are secured journal boxes 11 in which are mounted rollers 12, as best shown in Figure 1, a single roller being disposed at the bottom of the track and another roller being disposed at the top of the track and in the same vertical plane with the bottom roller, while upon the upper bends or arcs of the track are mounted other rollers. All of the rollers operate between the side bars or rails of the tracks and are provided with central flanges 13 to aid in guiding the weed cutter, as will later appear. Secured to the front and rear cross bars of the main frame are arms or brackets 14 which project laterally, as clearly shown in Figure 3, and secured to the tracks at the ends thereof are pivot rods 15 which project forwardly and rearwardly from the ends of the track and extend through openings provided therefor in the ends of the arms 14 whereby the tracks may be rotated about their longitudinal axes. Nuts 16 mounted upon the extremities of the pivot rods are adapted to be turned home against the supporting rods or brackets 14 and thereby maintain the tracks in supported relation. These arms 14 and pivot rods are mounted mid-way between the tops and bottoms of the tracks at the ends thereof, as will be readily understood, and permit the tracks to be set in any desired angular relation to the main frame so that the gangs of weed cutters mounted to travel about the tracks will be adjusted as desired. A cross bar 17 is secured upon the main frame and upon this cross bar is a post 18 having an opening near its upper end on its central vertical line to receive a locking pin 19. Brackets or lugs 20 are provided on the tracks at the tops thereof and near the centers of the tops, and to these lugs or brackets are pivoted the upper ends of adjustable braces 21 having series of openings 22 in their free end portions, as shown in Figure 2, the free ends of the arms intersecting at the rear of the post 18 and the locking pin or bolt 19 being inserted through registering openings of the locking bars and the post so that the angular position of the tracks will be maintained. It is also to be noted that a crank arm 23 is secured upon the axle 2 and rises therefrom, and to the upper end of this crank arm is pivoted a connecting rod 24 which extends rearwardly to a hand lever 25 mounted upon the main frame at the rear end thereof and equipped with the usual latch 26 engaging a segment 27 fixed upon the main frame at the pivot of the lever. This lever is within convenient reach of the driver upon the seat 8 and, when the lever is drawn rearwardly, the cranked ends of the axle will be swung forwardly and upwardly so that the ground wheels 4 will be raised from the ground and the main frame and tracks will be relatively lowered so that the weed cutting blades mounted upon the tracks will be set to cut through and destroy the unwanted growth.

Arranged within each track, and engaged and guided by the several rollers, is an endless series of links 28, each link comprising three plates set side by side with the outer edges of the side plates projecting below the corresponding edge of the inner or center plate whereby a groove is defined to receive the flanges of the several rollers and thereby guide the links in their travel. The center plate has one end projected beyond the corresponding ends of the side plates and has an opening therethrough to receive a pivot pin. The opposite end of the center plate is provided with a notch having a curved surface corresponding with the curved surface of the projecting end of the engaged link and the side plates at their corresponding ends have curved notches completing the circle defined by the projecting end of the center plate and at their opposite ends are provided with openings to receive the pivot pin whereby the adjacent links are pivotally connected in an endless chain. Secured centrally to the side plates of each link are stirrups or anchors 29 which extend upwardly or inwardly from the links so as to be disposed at the inner sides of the tracks and at right angles to the tops and bottoms of the tracks and radial to the curved ends of the tracks, as will be understood upon reference to Figure 1. Secured rigidly to the outer sides of the stirrups or anchors 29 are carrying frames each of which comprises a vertical portion 30 which bears against the side of the stirrup and is rigidly secured thereto. From the lower end of this basal portion 30 depends a vertical member 31 which is slightly offset so as to clear the tracks, as shown in Figure 2, and from the inner end of this vertical offset portion extends inwardly a horizontal arm 32 which is disposed below and extends across the track and the bottom roller mounted upon the track, and it may be noted at this point that the use of the term "below" is for convenience only and the structure now being considered is repeated throughout the entire extent of the chain of links and destroyer blades and that at times the arm 32 will be above the tracks and at other times will be at the ends of the tracks. Extending outwardly from the upper end of the basal portion 30 of these suspending frames is a short arm 33 from which extends outwardly and downwardly an inclined arm 34. At the end of the inclined arm 34 is a short vertical member 35 and at the extremity of the horizontal arm 32 is a similar member 36, the lower ends of the members 35 and 36 being connected by a cross bar 37. These several parts may all be formed integral so that the suspending frame may be a single casting. A set bolt 38 is mounted in the arm 32 near the end thereof and a lug 39 is provided upon the arm 35 near its lower end. The blades 40 are supported upon the cross bar 37 and are held thereon by a presser bar 41 extending across the tops or bridges of the blades and engaged at one end under the lug 39 and held at its opposite end by the set bolt 38 down upon the blades.

As shown in Figure 1, the blades have divergent front and rear portions 42 and 43 and upper connecting portions 44 which pass over the bar 37 so that the blades will be suspended from said bar. The arm 42 is shorter than the arm 43 and the alternate blades are relatively reversed so that the shorter arms of the blades in one gang will be presented to the longer arms of the blades in an adjacent gang when the gangs are in the weed cutting position which is when they are at the center of their lower travel and make their closest approach to the ground. The blades, consequently, engage the weeds or other growth and cut through the same with a scissors like action.

Extending through and secured in the upper end of each stirrup 29 is a stop member 45 in the form of a short plate fitting snugly between the sides of the stirrup and having a short hook 46 at one end and a relatively curved arm 47 at its opposite end terminating in a hook 48. The hook 46 of one stop device rides upon the elongated curved arm 47 of the following device and is engaged by the hook 48 of said arm when the plates are in their cutting position so that separation of the upper ends of the stirrups at this time will be prevented and spreading of the blades avoided. Of course, as the stirrups pass around the arcuate ends of the tracks, the upper or inner ends of the stirrups will approach and the blades will separate and these retainers hold the stirrups in alinement at all times so that the blades will be maintained in proper position to cut through the weeds as they interengage during the travel of the machine.

From the foregoing description, taken in connection with the accompanying drawings, it will be seen that I have provided a very compact and efficient mechanism whereby weeds will be cut through and destroyed. As shown in Figure 1, the ground wheels of the machine are in the lowest position and the blades will not penetrate the ground but may cut through brushy growth which has obtained some height. As hereinbefore stated, if the crank arm 23 be rocked rearwardly, the ends of the axle will be swung forwardly and upwardly and, consequently, the wheels will be raised relative to the main frame and the elliptical tracks, the blades, therefore, being set to cut deeper into the ground and penetrate the roots of the obnoxious growth. When the parts have been adjusted so that the blades will engage the ground, their contact with the ground will cause the lowermost blade to travel rearwardly with respect to the machine as the machine is drawn forward over the field and, of course, each blade and its supporting structure tend to push against the supporting structure at its immediate rear and, in turn, will be pushed by the hanger or supporting structure immediately in advance. By shifting the locking bars or braces 21 as described, the tracks may be caused to approach or recede in their upper portions and their lower portions will, consequently, be swung in opposite directions so that the gangs of weed-destroying blades may be set at any desired inclination so as to conform to the grade of the soil upon which the machine is being operated.

Having thus described the invention, what is claimed as new is:

1. An agricultural machine comprising a wheel-supported main frame, endless tracks connected with the main frame at the sides of the same and having connected upper and lower portions, series of ground-engaging implements mounted for travel upon said tracks, and means on the main frame and connected with the upper portions of the tracks for setting the tracks in an inclined position transversely of the frame.

2. An agricultural machine comprising a wheel-supported main frame, tracks carried by the main frame at the sides thereof, ground-engaging implements mounted to travel upon the tracks, a post upon the main frame between the tracks, locking bars pivotally connected with the tracks and extending inwardly therefrom to the post, and means for adjustably securing the inner ends of said locking bars to the post whereby to set the tracks in inclined positions transversely of the frame.

3. An agricultural machine comprising a wheel-supported main frame, tracks disposed at the sides of the main frame, pivotal connections between the tracks and the ends of the frame whereby the tracks may be tilted transversely of the frame, ground-engaging implements mounted to travel upon the tracks, and means between the tracks for securing them in set inclined positions.

4. An agricultural machine comprising a wheel-supported main frame, endless tracks mounted upon the frame at the sides of the same, endless chains mounted for travel at the inner sides of the tracks, stirrups secured to the links of said chains and extending inwardly therefrom with respect to the tracks, suspending frames secured to the outer sides of said stirrups and extending beyond the tracks, and gangs of blades carried by said frames.

5. An agricultural machine comprising a wheel-supported main frame, tracks mounted on the frame at the sides of the same, endless series of links mounted for travel on the inner sides of the tracks, stirrups secured to the links and extending inwardly therefrom, ground-engaging implements suspended from said stirrups, and retainers at the inner ends of the stirrups, each retainer comprising a plate extending through a stirrup and having a hook at one end and a relatively elongated arm at the opposite end terminating in an inwardly directed hook, the hook on one retainer riding upon the elongated arm of an adjacent retainer and engaging the hook at the end of said arm.

6. An agricultural machine comprising a wheel-supported main frame, tracks mounted upon the frame at the sides of the same, endless series of links mounted to travel at the inner sides of the tracks, suspending frames connected with the links and extending beyond the tracks, and ground-engaging blades suspended on said frames.

7. An agricultural machine comprising a wheel-supported main frame, endless tracks mounted on the frame at the sides of the same, endless series of links mounted to travel upon the inner sides of the tracks, suspending frames connected with the several links and clearing the tracks, series of blades having divergent members and portions connecting said members resting on the bottoms of the suspending frames, the divergent members of each blade being of unequal length and the alternate blades being relatively reversed, and a clamping bar extending across the connecting end portions of the blades and secured in the suspending frames to bear upon the blades.

8. An agricultural machine comprising gangs of blades, each blade having divergent arms of unequal length, the blades in adjacent gangs and adjacent blades in the same gang being relatively reversed, and means for effecting travel of the gangs whereby to penetrate and cut vegetation.

HARVEY N. BINGHAM.